(12) United States Patent
Corbin et al.

(10) Patent No.: US 6,594,823 B1
(45) Date of Patent: Jul. 15, 2003

(54) METHOD AND SYSTEM FOR REPRESENTING A HIGH-LEVEL PROGRAMMING LANGUAGE DATA STRUCTURE IN A MARK-UP LANGUAGE

(75) Inventors: Lyle S. Corbin, Bothell, WA (US); Joseph A. Porkka, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 09/660,791

(22) Filed: Sep. 13, 2000

(51) Int. Cl.[7] .......................... G06F 9/45; G06F 15/00
(52) U.S. Cl. ........................ 717/143; 717/106; 715/513
(58) Field of Search ................. 717/143, 106–109, 717/118; 707/103; 715/513

(56) References Cited

U.S. PATENT DOCUMENTS

| | | | | |
|---|---|---|---|---|
| 5,748,186 A | * | 5/1998 | Raman | 715/500.1 |
| 5,970,490 A | * | 10/1999 | Morgenstern | 707/10 |
| 6,131,067 A | * | 10/2000 | Girerd et al. | 701/213 |
| 6,209,124 B1 | * | 3/2001 | Vermeire et al. | 717/114 |
| 6,308,198 B1 | * | 10/2001 | Uhler et al. | 709/200 |
| 6,446,256 B1 | * | 9/2002 | Hyman et al. | 717/143 |
| 6,502,112 B1 | * | 12/2002 | Baisley | 717/143 |

OTHER PUBLICATIONS

Cheney. Compressing XML with Multiplexed Hierarchical PPM Models. IEEE. 2001. pp. 163–172.*
Koch. XML in practice: the groupware case. IEEE. 1999. pp. 309–314.*
Microsoft Corporation, *C# Language Specification,* Version 0.28, pp. 1–362; Microsoft Corporation (1999–2000).
Microsoft Corporation, *C# Introduction and Overview,* Visual Studio.net accessed from Internet Jan. 25, 2002. pp. 1–4 Microsoft Corporation (2002).
King, Donald, *Passing Objects Using XML: Java Clients and Java Servlets,* Pinnacle Publishing (2002) accessed from internet Jan. 25, 2002.
Baldwin, Richard, *XML and Java Objects,* Part 1; pp. 1–6, Jun. 27, 1999, copyright 2000, accessed from internet Jan. 30, 2002.
Baldwin, Richard, *XML and Java Objects,* Part 2; pp. 1–8, Jul. 11, 1999, copyright 2000, accessed from internet Jan. 25, 2002.
Surveyer, Jacques, *XML Meets Java: XML presents a myriad of new tools and strategies to consider,* pp. 1–6, Fawcette Technical Publications copyright 1999, accessed from internet Jan. 25, 2002.
W3C XML Working Group; *Extensible Markup Language (XML) 1.0*; W3C Recommendation Feb. 10, 1998, pp. 1–32.
Trupin, Joshua; *Sharp New Language: C#Offers the Power of C++and Simplicity of Visual Basic*; pp. 1–9, MSDN Magazine (Sep. 2000).

* cited by examiner

Primary Examiner—Gregory Morse
Assistant Examiner—Wei Zhen
(74) Attorney, Agent, or Firm—Leydig, Voit & Mayer, Ltd.

(57) ABSTRACT

A novel method and system for representing a high-level programming language data structure in a mark-up language is provided, in which each variable of data structure is represented as a mark-up language element. The nesting of the elements represents the hierarchical relationship among the variables. Each element includes the name of the variable represented by the element and the type of the variable. The variable name may be included as the tag name, and the variable type may be included as an attribute. Additionally, a default value for the variable may be included as an attribute. Finally, comments to be included in the resulting high-level language source code may be represented in the body of the element.

46 Claims, 6 Drawing Sheets

```xml
<Machine type="hash">                                                                                                          ⎫
<!--"Machine" is a hash array indexed by machine name-->                                                                       ⎪
<strName type="string">machine name</strName>                                                                                  ⎪
<strStatus type="string" default="idle">idle,busy,waiting</strStatus>                                                          ⎬ 202
<strLog type="string">Contents of detailed log for this machine</strLog>                                                       ⎪
<Enlistment type="array">                                                                                                      ⎪
  <!--"Enlistment" is an array of known enlistments on the machine (given in env. template)-->                                 ⎭
  <strRootDir type="string">Root directory of enlistment (e.g. d:\newnt)</strRootDir>                                          ⎫
  <strBinaryDir type="string">Place where built binaries get put (e.g. d:\binaries.*)</strBinaryDir>                           ⎬ 210
  <fEnabled type = "boolean" default = "false">Is the enlistment enabled?</fEnabled>                                           ⎭
</Enlistment>
</Machine>
```

204 — `<strName type="string">machine name</strName>`
206 — `<strStatus ...>`
208 — `<strLog ...>`
212 — `<strRootDir ...>`
214 — `<strBinaryDir ...>`
216 — `<fEnabled ...>`

```
function Enlistment()
{
    // "Enlistment" is an array of known enlistments on the machine (given in env. template)
    this.strRootDir = '';           // Root directory of enlistment (e.g. d:\newnt)
    this.strBinaryDir = '';         // Place where built binaries get put (e.g. d:\binaries.*)
    this.fEnabled = false;          //Is the enlistment enabled?
} function Machine()
{
    // "Machine" is a hash array indexed by machine name
    this.strName = '';              // machine name
    this.strStatus = 'idle';        // idle,busy,waiting
    this.strLog = '';               // Contents of detailed log for this machine
    this.aEnlistment = new Array();
    // "Enlistment" is an array of known enlistments on the machine (given in env. template)
}
```

METHOD AND SYSTEM FOR REPRESENTING A HIGH-LEVEL PROGRAMMING LANGUAGE DATA STRUCTURE IN A MARK-UP LANGUAGE

TECHNICAL FIELD OF THE INVENTION

This invention relates generally to uses of mark-up language and, more particularly, to a method and system for representing a high-level programming language data structure in a mark-up language.

BACKGROUND OF THE INVENTION

There are currently a myriad of high-level programming languages available for a programmer to use. Some of the more popular ones include JAVA, JAVA Script and C++. Each high-level languages has its own way of defining data structures, such as arrays, integers, strings, and the like. However, a data structure written in the source code of one language generally cannot be compiled by a compiler of a different language. Thus, if a programmer is working on a system in which two or more different programming languages are being used, but all require access to the same data structure, then he or she is forced to write the data structure in each applicable language. This is particularly cumbersome when the data structure needs to be changed during the debugging process.

SUMMARY OF THE INVENTION

In accordance with the foregoing, a novel method and system for representing a high-level programming language data structure in a mark-up language is provided. According to the method, each variable of data structure is represented as a mark-up language element. The nesting of the elements represents the hierarchical relationship among the variables. Each element includes the name of the variable represented by the element and the type of the variable. The variable name may be included as the tag name, and the variable type may be included as an attribute. Additionally, a default value may be included as an attribute. Finally, comments to be included in the resulting high-level language source code may be represented in the body of the element.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 shows an example of how a data structure representation shown in FIG. 3 may be implemented as an XML document according to a preferred embodiment of the invention;

DETAILED DESCRIPTION OF THE PREFERRED EMBODIMENTS

Figure 1:
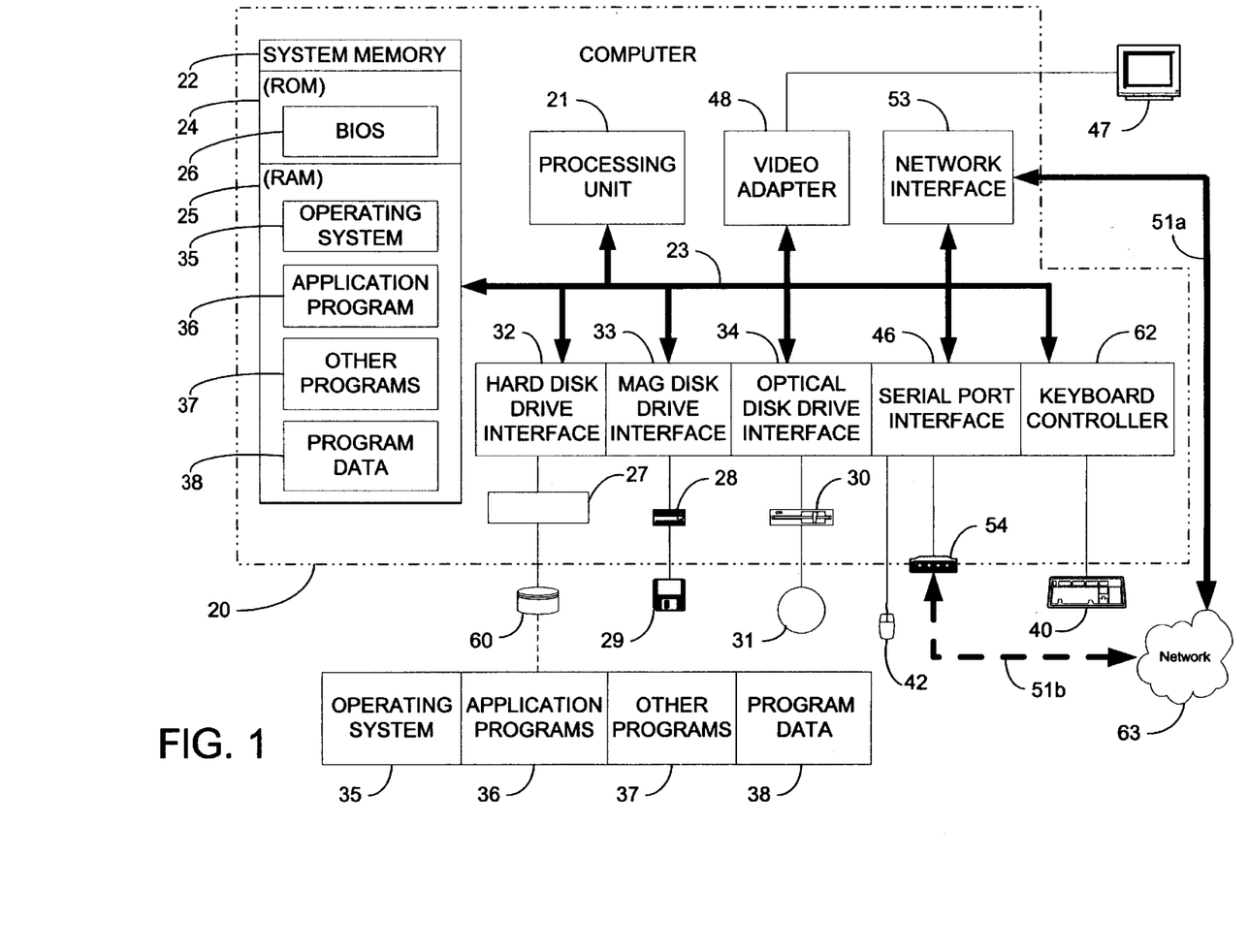
FIG. 1 is a block diagram generally illustrating an example computer environment in which the present invention may be practiced.

Turning to the drawings, wherein like reference numerals refer to like elements, an exemplary environment for implementing the invention is shown in FIG. 1. The environment includes a computer 20, including a central processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in the ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A user may enter commands and information into the computer 20 through input devices such as a keyboard 40, which is typically connected to the computer 20 via a keyboard controller 62, and a pointing device, such as a mouse 42. Other input devices (not shown) may include a microphone, joystick, game pad, wireless antenna, scanner, or the like. These and other input devices are often connected to the processing unit 21 through a serial port interface 46 that is coupled to the system bus, but may be connected by other interfaces, such as a parallel port, game port, a universal serial bus (USB), or a 1394 bus. A monitor 47 or other type of display device is also connected to the system bus 23 via an interface, such as a video adapter 48. In addition to the monitor, computing devices typically include other peripheral output devices, not shown, such as speakers and printers.

The computer 20 may operate in a networked environment using logical connections to one or more devices within a network 63, including another computer, a server, a network PC, a peer device or other network node. These devices typically include many or all of the elements described above relative to the computer 20. The logical connections depicted in FIG. 1 include a land-based network link 51a, for which there are many possible implementations, including a local area network (LAN) link and a wide area network (WAN) link 51b. Land-based network links are commonplace in offices, enterprise-wide computer networks, intranets and the Internet and include such physical implementations as coaxial cable, twisted copper pairs, fiber optics, wireless, and the like. Data may be transmitted over the network links 51a–51b according to a variety of well-known transport standards, including Ethernet, SONET, DSL, T-1, and the like. When used in a LAN, the computer 20 is connected to the network 63 through a network interface card or adapter 53. When used in a WAN, the computer 20 typically includes a modem 54 or other means for establishing communications over the network link 51b, as shown by the dashed line. The modem 54, which may be internal or external, is connected to the system bus 23 via the serial port interface 46. In a networked environment, programs depicted relative to the computer 20, or portions thereof, may be stored on other devices within the network 63.

Those skilled in the art will appreciate that the meaning of the term "computer" is not limited to a personal computer, but includes other microprocessor or microcontroller-based systems, such as hand-held devices, multi-processor systems, microprocessor based or programmable consumer electronics, network PCs, minicomputers, mainframe computers, Internet appliances, and the like. The invention may also be practiced in distributed computing environments where tasks are performed by remote processing devices that are linked through a communications network.

In the description that follows, the invention will be described with reference to acts and symbolic representations of operations that are performed by one or more logic elements. As such, it will be understood that such acts and operations may include the execution of microcoded instructions as well as the use of sequential logic circuits to transform data or to maintain it at locations in the memory system of the computer. Reference will also be made to one or more programs or modules executing on a computer system or being executed by parts of a CPU. A "program" or "module" is any instruction or set of instructions that can execute on a computer, including a process, procedure, function, executable code, dynamic-linked library (DLL), applet, native instruction, module, thread, or the like. In a distributed computing environment, parts of a program or module may be located in both local and remote memory storage devices. A program or module may also include a commercial software application or product, which may itself include several programs. However, while the invention is being described in the context of software, it is not meant to be limiting as those of skill in the art will appreciate that various of the acts and operation described hereinafter may also be implemented in hardware.

The invention is generally directed to a method and system of representing a high-level programming language data structure in a mark-up language. A mark-up language is a language that describes the structure of a document. Mark-up languages generally conform to a model that is similar to a database schema and, thus, mark-up language documents can be stored in databases, processed and viewed by software programs such as browsers. The most well-known examples of markup languages are the Standard Generalized Mark-up Language (SGML) and all of its variants, including Hypertext Markup Language (HTML) and Extensible Markup Language (XML).

In accordance with an embodiment of the invention, each mark-up language element represents a variable of the data structure being represented. Each element contains the name and type of the variable, and the nesting of the elements represents the hierarchical relationship among the variables. The resulting mark-up language construct may then be parsed and rendered into any of a number of high-level language source codes. This novel method and system allows a programmer to create a single version of the data structure for use by two or more programs written in different high-level programming languages. For example, a data structure may be written once in XML and translated into several high-level programming languages, such as C++, Java, Ada, Visual Basic, and Pascal. The invention may also be used with various web-page scripting languages, such as "VBScript," and implementations of ECMAScript, such as "Jscript" and "JavaScript."

Figure 2:
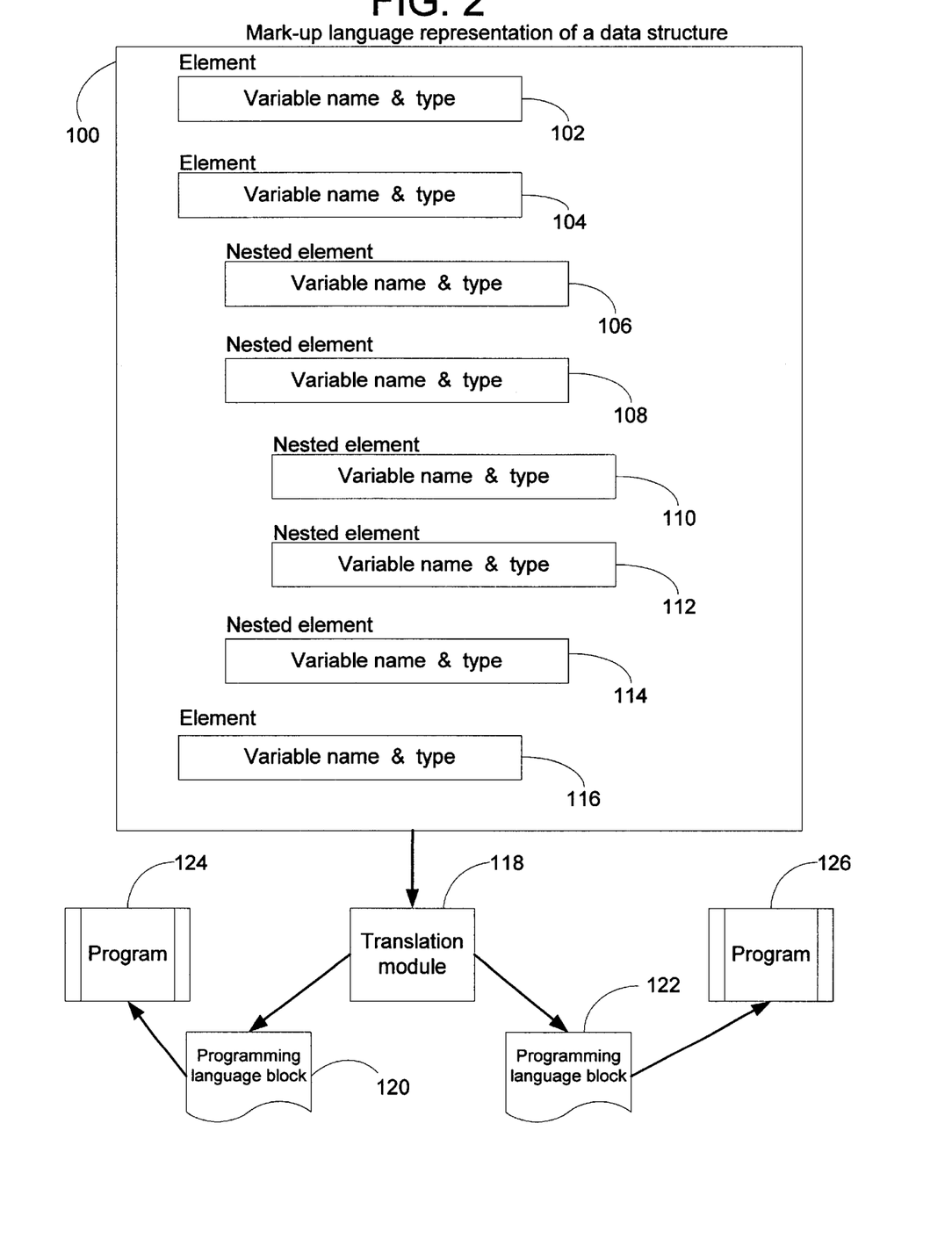
FIG. 2 illustrates an embodiment of a mark-up language representation of a data structure created in accordance with the invention.

An embodiment of a mark-up language representation of a data structure created in accordance with the invention is illustrated in FIG. 2. The mark-up language representation, generally labeled 100, includes mark-up language elements 102, 104, 106, 108, 110, 112, 114 and 116. Each element represents a high-level programming language variable, and contains the variable name and the variable type. An element may also contain other information as well, such as a comment to be inserted into the source code near the variable. The elements may be nested to represent the hierarchical relationship among the variables they represent. For example, the nested elements 106, 108 and 114 are child elements of the element 104, and therefore represent variables that are subordinate to the variable represented by the element 104. The nested elements 110 and 112 are child elements of the nested element 108, and thus represent variables that are subordinate to the variable represented by the element 108.

Referring again to FIG. 2, a translation module 118 may import the representation 100 (in the form of a mark-up language document, for example) and translate the representation into one or more blocks of high-level programming language source code, such as programming language block 120 and programming language block 122. Each programming language block may be in a different source code and may be used by programs written in different high-level languages, such as the programs 124 and 126. For example, the representation 100 may be written in XML, the blocks 120 and 122 may be in C++ and MICROSOFT JSCRIPT respectively, and the programs 124 and 126 may.be respective C++ and JSCRIPT programs.

In accordance with the invention, any mark-up language may be used to represent a high-level programming language data structure. However, XML is known to be particularly advantageous for this purpose. One reason for this is that it is flexible, and allows a programmer to define his or her own terms or code words. Another reason is that XML is hierarchical, and can thus easily represent the hierarchical nature of most data structures. Finally, there are many readily-available XML editors that can show the nesting structure and make the data hierarchy readily known to a programmer.

There are many ways that XML can be used to represent high-level language data structures. In one embodiment, each XML element contains the name and type of the variable represented in its start tag, with the variable name being the tag name and the variable type being an attribute.

For example, a character string variable "strExample" may be represented in XML as follows:

<strExample type="string"></strExample>

A default value may also be specified as an attribute:

<strExample type="string" default= "this is a default value"></strExample>

Finally, comments may be placed into the body of the element:

<strExample type="string" default= "this is a default value">These are comments about the variable strExample</strExample>

A translation program may then be written to parse the XML code based on the above-described rules, create a block of high-level source code based on the variable names, types and default values contained in the tags of the elements, and to insert the appropriate comments based on the bodies of the elements.

Figure 3:
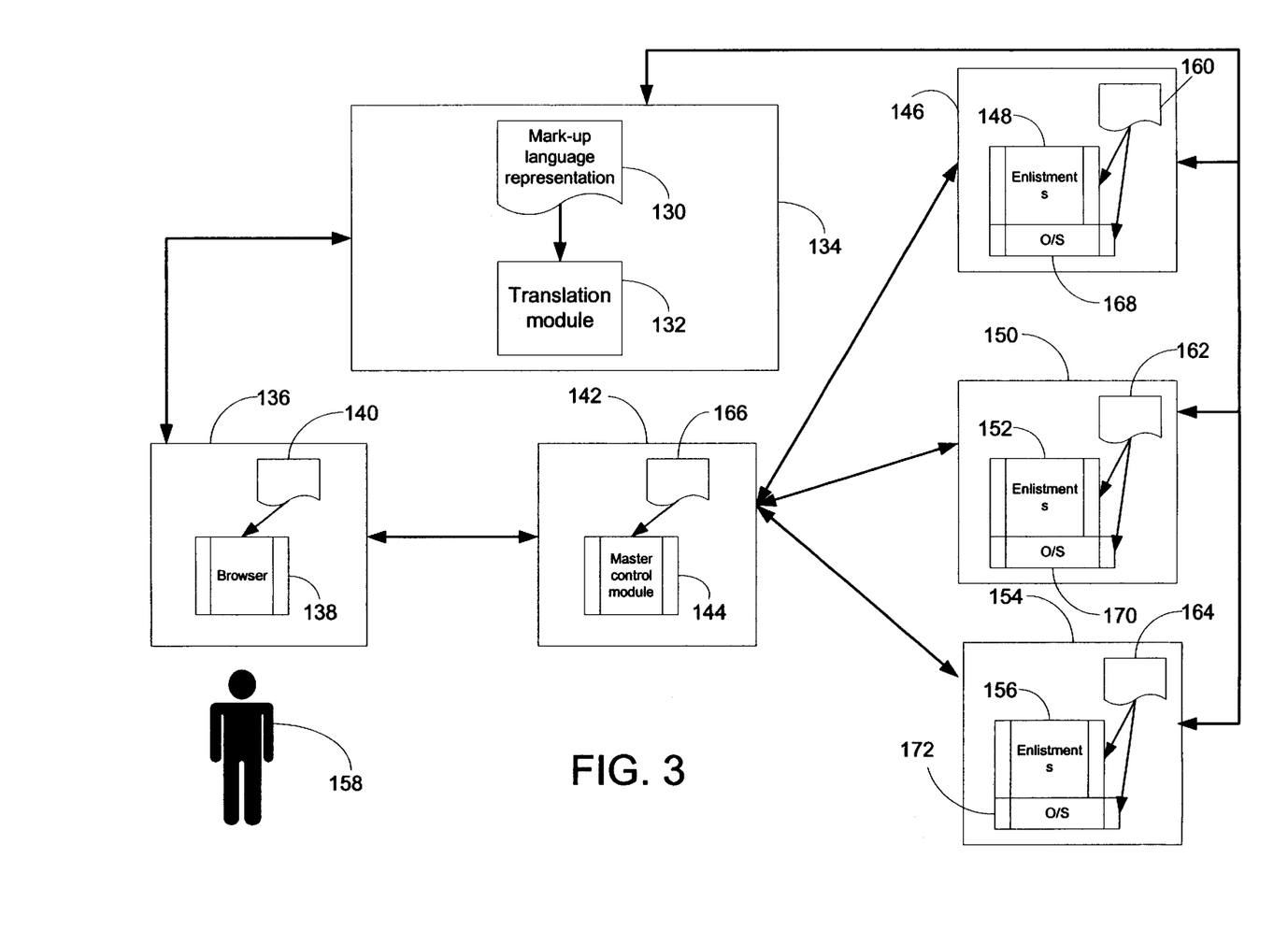
FIG. 3 shows an example of a scenario in which the invention may be used.

As described previously, the invention may be used to allow two or more programs, each written in a different high-level language, to use a single, mark-up language representation of a data structure. Referring to FIG. 3, an example of a scenario in which this would be advantageous is shown. A computer 136 is communicatively linked to a computer 134 and a computer 142. The computer 134 is further linked to computers 146, 150 and 154, which are themselves communicatively linked to the computer 142. The computer 136 acts as a console for use by a test engineer 158 and includes a web browser 136 that displays web pages and interacts with a Java Script data structure 140. The computer 142 includes a master control module 144 for coordinating the activities and monitoring the status of the computers 15 146, 150 and 152 and a Java Script data structure 164 that interacts with the control module 144. The computers 146, 150 and 154 each act as slave machines to the computer 142 and each includes a respective operating system and a several versions or "enlistments" of a source code module. Specifically, the computer 146 includes enlistments 148 and an operating system 168, the computer 150 includes enlistments 152 and an operating system 170, and the computer 154 includes enlistments 156 and an operating system 172. Each of the enlistments 148, 150 and 154 represents a different version of the source code, is written in C++, and interacts with a C++ data structure 160, 162 and 164 respectively. The C++ data structures also interact with the operating systems on their respective machines.

Referring still to FIG. 3, the computer 134 includes an representation 130 of a data structure in accordance with an embodiment of the invention, as well as a translation module 132 for translating the representation 130 into a block of Java Script source code for the Java Script module 140, and for translating the representation 130 into a block of C++ code for the enlistments 148, 150 and 154. The mark-up language representation 100 represents a data structure for holding status information about each of the of the slave machines 146, 150 and 154. A Java Script language version of the data structure resides on the console computer 136 and is referenced by the browser 138 to allow the test engineer 158 to view the current status of each machine. C++ language versions of the data structure reside on the slave computers, and allow the respective enlistment modules and operating systems to update their status information and supply the updates to a Java Script version 164 of the data structure residing on the computer 142. Using the set-up shown in FIG. 3, the test engineer 158 can compile a different enlistment of a single program on each of the slave computers 146, 150 and 154 and view the status of each machine, including the status of each enlistment, at the console computer 136.

FIG. 4 shows an example of how the data structure representation 130 may be implemented as an XML document according to a preferred embodiment of the invention. The XML document, includes a plurality of XML elements, each of which is delineated by a start tag and an end tag, for representing the variables included in the represented data structure. Each pair of start and end tags includes a tag name, which represents the name of the variable. Each start tag also includes a "type" attribute to represent the type of variable. The types defined for the embodiment of FIG. 4 include "string" for character string variables, "boolean" for boolean variables, "array" for array variables, and "hash" for hash variables. Each start tag may also include a "default" attribute for indicating the default value of the represented variable. The body of each element may contain a line of text to be used for comments.

The variables represented by each element of FIG. 4 will now be described. A "Machine" element 202 represents a hash variable for holding data as to the state of each machine. The child elements of "machine" include a "strName" element 204 representing a string variable for holding the name of a machine; a "strStatus" element 206 representing a string variable for holding the status of the machine (idle, busy or waiting); a "strLog" element 208 representing a string variable for holding the contents of a log for the machine; and an "Enlistment" element 210 representing an array variable for holding information about the status of each enlistment.

Referring still to FIG. 4, the child elements of the "Enlistment" element 210 include a "strRootDir" element 212 representing a string variable for holding the name of the root directory of a machine; a "strBinaryDir" element 214 representing a string variable for holding the name of the directory in which binary files of an enlistment are stored; and an "fenabled" element 216 representing a boolean variable for holding indicated whether the enlistment is even on the machine (i.e. whether it is enabled).

Figure 5:
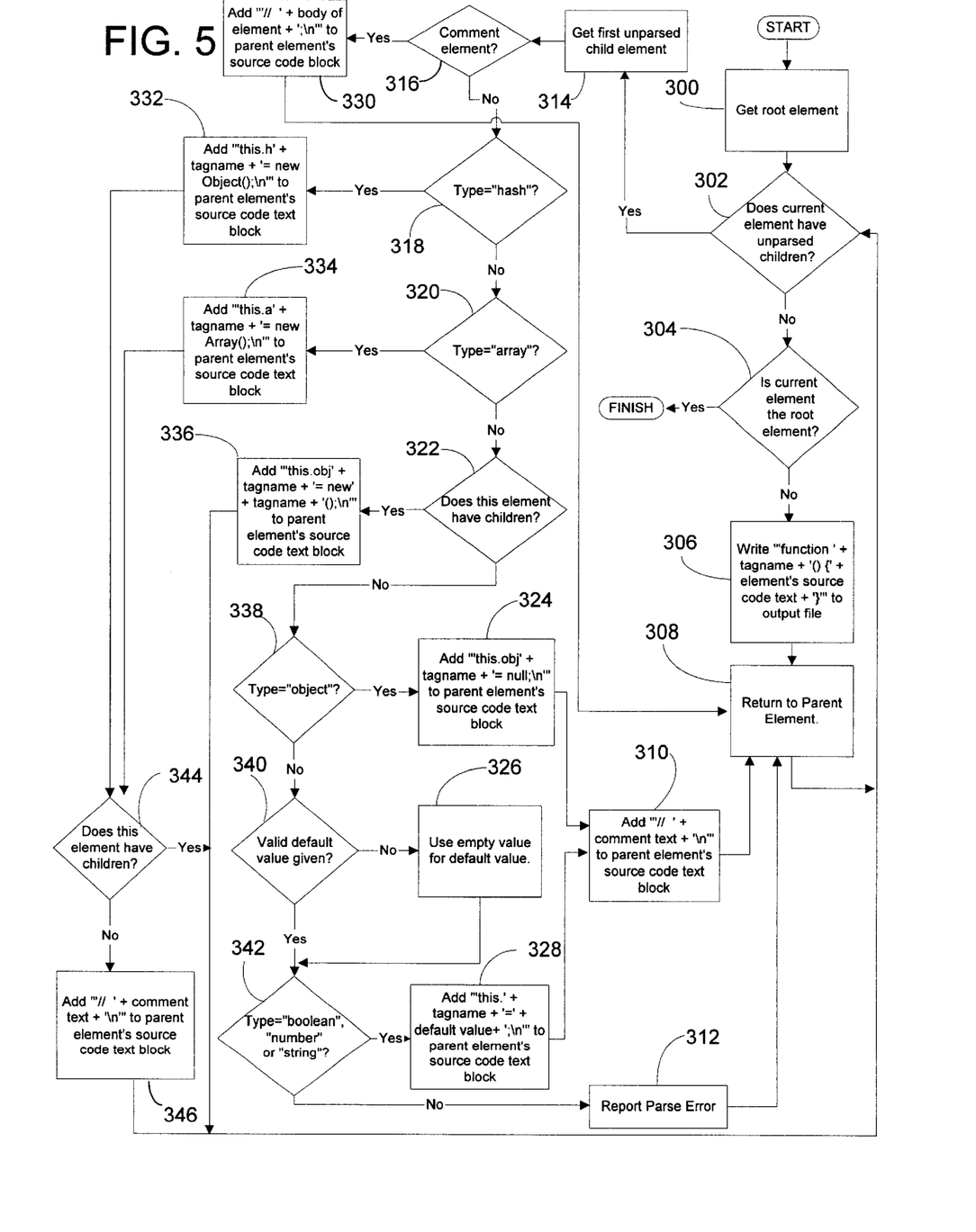
FIG. 5 is a flowchart generally illustrating a procedure that may be used to convert an XML representation of a data structure into a block of JSCRIPT according to an embodiment of the invention.

To convert an XML representation of a data structure into a block of JSCRIPT source code according to an embodiment of the invention, a translation program, such as the translation module 132 of FIG. 3, may execute the procedure illustrated by the flowchart of FIG. 5. At step 300, the program gets the root element from the mark up language file. The flow then proceeds to step 302, at which the program determines whether the current element has any unparsed child elements. If so, then the flow proceeds to step 314. If not then the flow proceeds to step 304, at which the program determines whether the current element is the root element. If the current element is the root element, then the process is complete. If the current element is not the root element, then the flow continues at step 306, at which the program writes "'function'+tag name+'( ){'+the element's source code text+'}'" to the output file. The flow then proceeds to step 308 at which the program returns to the parent element. The program then returns to step 302.

If the YES branch is taken at step 302, then the flow proceeds to step 314, at which the program obtains the first unparsed child element. At step 316, at which the program determines whether the element is a comment element. If the element is a comment element, then the flow moves to step 330. At step 330 the program adds "'//'+the body of the element+';\n'" to the parent element's source code block.

The flow then proceeds from step 330 to step 308. If, at step 316, the program determines the element is not a comment element, then the flow proceeds to step 318 at which the program determines whether the element is a hash element. If the element is a hash element then the flow proceeds to step 332 at which the program adds "'this.h'+tag name+'= new Object( );\n'" to the parent element's source code text block. The flow then proceeds from step 332 to step 344. At step 344, the program determines whether the element has children. If the element does have children then the flow continues to step 340. If the element does not have children, then the flow proceeds to step 346 at which the program adds "'//'+comment text+'n'" to the parent element's source code text block. The flow then proceeds from step 346 back to step 302.

If, at step 318, the element was determined not to be a hash element then the flow proceeds to step 320 at which the program determines whether the element is an array element. If the element is an array element the flow proceeds to step 334 at which the program adds "'this.a'+tag name+ '=new Array( );\n'" to the parent element's source code text block. The flow then proceeds from step 334 to step 344. If, at step 320, the element is determined not to be an array element the flow proceeds to step 322. At step 322 the program determines whether the element has children. If the element is determined to have children then the flow proceeds to step 336, at which the program adds "'this.obj'+tag name+'new'+tag name+'( );\n'" to the parent element's source code text block.

If, at step 322, the element is determined not to have children then the flow proceeds to step 338. At step 338 the program determines whether the element is an object element. If the element is determine to be an object element then the flow proceeds to step 324 at which the programs adds "'this.obj'+tag name+'=null;\n'" to the parent element's source text block. The flow then proceeds from step 324 to step 310 at which the program adds "'\\'+ comment text+'\n'" to the parent element's source code text block. The flow then proceeds from step 310 to step 308.

Figure 6:
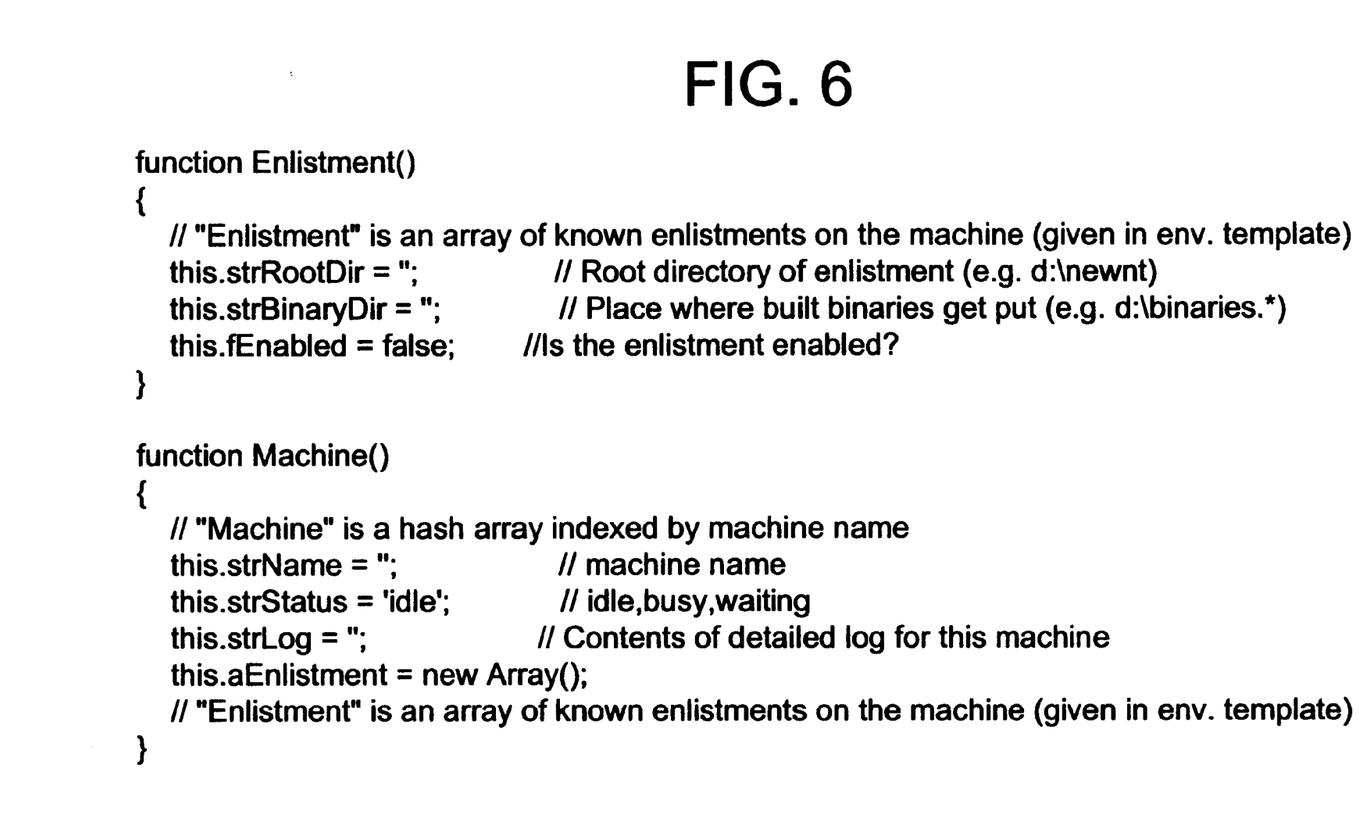
FIG. 6 shows an example of the output that may result when the XML document of FIG. 4 is processed according to the procedure of FIG. 5.

If, at step 338, the element is determined not to be an object element then the flow proceeds to step 340 at which the program determines whether there is a valid default value given for the element. If the valid default value has not been given for the element, then the flow proceeds to step 326 at which the program assigns a empty value for the default value. If, at step 340, the element is determine to have a valid default value then the flow proceeds to step 342. At step 342 the program determines whether the element is a Boolean element, a number element, or a string element. If the element is determined to be any of these three types, then the flow proceeds to step 328. At step 328 the program adds "'this.'+tag name+'='+default value+';\n'" to the parent element's source code text block. The flow then proceeds to step 310 from step 328. If, at step 342, the program determines that the element type is none of the three choices, the flow proceeds to step 312 at which the program reports a parse error. The flow then proceeds from step 312 to step 308. An example of a the JSCRIPT code that results upon processing the XML representation of FIG. 4 according to the foregoing procedure is shown in FIG. 6.

It can thus be seen that a new and useful method and system for representing a high-level programming language data structure has been described. In view of the many possible embodiments to which the principals of this invention may be applied, it should be recognized that the embodiments described herein with respect to the drawing figures are meant to be illustrative only and should not be taken as limiting the scope of the invention. It should also be recognized that the various steps involved in carrying out the methods described above as well as the specific implementation of each step described above may be changed in ways that will be apparent to those of skill in the art.

Finally, those of skill in the art will recognize that the elements of the illustrated embodiment shown in software may be implemented in hardware and vice versa, and that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having stored thereon a data structure comprising a plurality of mark-up language elements, wherein each element represents a variable of a high-level programming language data structure, at least one of the elements being nested with respect to at least one other element to represent a hierarchical relationship between the elements; and a plurality of tags comprising a tag for each element, wherein each tag includes the name of the variable represented by the element and the type of the variable.

2. The computer-readable medium of claim 1, wherein the name of each tag is the name of the variable represented by the element.

3. The computer-readable medium of claim 1, wherein the type of variable being represented is included as an attribute of the tag.

4. The computer-readable medium of claim 1, wherein the mark-up language is XML.

5. The computer-readable medium of claim 1, wherein the high-level language data structure is a java script data structure.

6. The computer-readable medium of claim 1, wherein at least one of the plurality of elements includes a comment for the variable as the body of the element.

7. The computer-readable medium of claim 1, wherein at least one tag of the plurality of elements includes a default value for the variable as an attribute.

8. A method of describing a high-level programming language data structure, the method comprising:
  (a) creating a mark-up language element representing a variable of the data structure;
  (b) inserting the name and type of the variable into the element;
  (c) repeating steps (a) and (b) for each of a plurality of variables of the data structure to create a plurality of mark-up language elements; and
  (d) creating a mark-up language document containing the elements, wherein at least one of the elements is nested to represent a hierarchical relationship with at least one other element.

9. The method of claim 8, wherein step (b) further comprises inserting the variable name as the name of the tag for the element.

10. A computer-readable medium having stored thereon computer executable instructions for performing the steps of claim 9.

11. The method of claim 8, wherein step (b) further comprises inserting the variable type as an attribute in the tag for the element.

12. A computer-readable medium having stored thereon computer executable instructions for performing the steps of claim 11.

13. The method of claim 8, wherein the mark-up language element is an XML element and the mark-up language document is an XML document.

14. A computer-readable medium having stored thereon computer executable instructions for performing the steps of claim 13.

15. The method of claim 8, wherein the high-level language data structure is a java script data structure.

16. A computer-readable medium having stored thereon computer executable instructions for performing the steps of claim 15.

17. The method of claim 8, further comprising inserting a comment for a variable into the body of the element representing the variable.

18. A computer-readable medium having stored thereon computer executable instructions for performing the steps of claim 17.

19. A computer-readable medium having stored thereon computer executable instructions for performing the steps of claim 8.

20. A method for translating a mark-up language document into a highlevel language source code, the data structure having a plurality of variables, the document comprising a plurality of elements, each element representing a variable of the plurality of variables, the method comprising:
 (a) parsing the document to determine the hierarchical relationship among the variables based on the nesting structure of the elements;
 (b) parsing each element to determine the name and type of the variable represented by the element; and
 (c) creating a block of source code in the high-level language, wherein the block includes the plurality of variables rendered into the high-level language with the names and types determined in step (b).

21. The method of claim 20, wherein step (b) further comprises parsing the tag of each element to determine the name of the variable represented by the element.

22. The method of claim 20, wherein step (b) further comprises parsing the tag of each element to determine the type of variable represented by the element.

23. The method of claim 20, further comprising parsing each element to determine a default value for the variable represented by the element.

24. A computer-readable medium having stored thereon computer-executable instructions for performing the method of claim 23.

25. The method of claim 20, further comprising parsing the tag of each element to determine a default value for the variable represented by the element.

26. The method of claim 20, further comprising parsing each element to determine a comment to be included in the source code block near the variable represented by the element.

27. The method of claim 20, further comprising parsing the body of each element to determine a comment to be included in the source code block near the variable represented by the element.

28. The method of claim 20, wherein step (b) further comprises parsing the tag of each element to determine the name and the type of the variable represented by the element, the method further comprising parsing the tag of each element to determine a default value for the variable represented by the element.

29. The method of claim 28, further comprising parsing each element to determine a comment to be included in the source code block near the variable represented by the element.

30. The method of claim 28, further comprising parsing the body of each element to determine a comment to be included in the source code block near the variable represented by the element.

31. The method of claim 28, wherein the mark-up language is XML and the high level language is a web-page scripting language.

32. A computer-readable medium having stored thereon computer-executable instructions for performing the method of claim 31.

33. A computer-readable medium having stored thereon computer-executable instructions for performing the method of claim 28.

34. The method of claim 20, wherein if the type of the variable is determined to be an array in step (b), creating an array variable in the source code, the created array variable having the name determined in step (b).

35. The method of claim 20, wherein if the type of the variable is determined to be a hash in step (b), creating a hash variable in the source code, the created hash variable having the name determined in step (b).

36. The method of claim 20, wherein if the type of the variable is determined to be an object in step (b), creating an object variable in the source code, the created object variable having the name determined in step (b).

37. The method of claim 20, wherein if the type of the variable is determined to be Boolean in step (b), creating a Boolean variable in the source code, the created Boolean variable having the name determined in step (b).

38. The method of claim 20, wherein if the type of the variable is determined to be a number in step (b), creating a number variable in the source code, the created number variable having the name determined in step (b).

39. The method of claim 20, wherein if the type of the variable is determined to be a string in step (b), creating a string variable in the source code, the created string variable having the name determined in step (b).

40. A computer-readable medium having stored thereon computer-executable instructions for performing the method of claim 20.

41. A method for translating an XML document into a web page scripting language, the method comprising:
 (a) parsing the XML document in the order of its nesting structure;
 (b) parsing each element of the XML document to determine whether the element represents a hash variable, an array variable, or an object variable;
 (c) for each element parsed, creating a block of web page script in the web page scripting language, the block having defined therein a hash variable, an array variable, or an object variable as determined in step (b), wherein a plurality of blocks of web page script are created thereby; and
 (d) arranging the plurality of blocks of web page scripting language in a hierarchy, the hierarchy corresponding to the nesting structure determined in step (a).

42. The method of claim 41, wherein the web page scripting language is an implementation of ECMAScript.

43. The method of claim 41, wherein the web page scripting language is JScript.

44. The method of claim 41, wherein step (b) further comprises parsing each element of the XML document to determine whether the element represents a number variable, a Boolean variable, or a string variable, and step (c) further comprises, for each element parsed, creating a block of web page script in the web page scripting language, the block having defined therein a number variable, a Boolean variable, or a string variable as determined in step (b).

45. A computer-readable medium having stored thereon computer-executable instructions for performing the method of claim 44.

46. A computer-readable medium having stored thereon computer-executable instructions for performing the method of claim 41.

* * * * *

UNITED STATES PATENT AND TRADEMARK OFFICE
CERTIFICATE OF CORRECTION

PATENT NO. : 6,594,823 B1
DATED : July 15, 2003
INVENTOR(S) : Corbin et al.

It is certified that error appears in the above-identified patent and that said Letters Patent is hereby corrected as shown below:

Column 4,
Line 51, "may.be" should read -- may be --.

Column 6,
Line 40, "fenabled" should read -- fEnabled --.

Column 7,
Lines 33 and 46, "determine" should read -- determined --.
Line 45, "assigns a empty" should read -- assigns an empty --.
Line 58, "of a the" should read -- of the --.

Signed and Sealed this

Sixth Day of July, 2004

JON W. DUDAS
*Acting Director of the United States Patent and Trademark Office*